(12) United States Patent
Vilajosana et al.

(10) Patent No.: US 10,953,599 B2
(45) Date of Patent: Mar. 23, 2021

(54) PRINTER WARMING DEVICE CONTROL (71) Applicant: Hewlett-Packard Development Company, L.P., Houston, TX (US)

(72) Inventors: Xavier Vilajosana, Sant Cugat del Valles (ES); Alejandro Manuel De Pena, Sant Cugat del Valles (ES); Sebastia Cortes I Herms, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 234 days.

(21) Appl. No.: 16/092,690

(22) PCT Filed: May 12, 2016

(86) PCT No.: PCT/US2016/032078
§ 371 (c)(1),
(2) Date: Oct. 10, 2018

(87) PCT Pub. No.: WO2017/196338
PCT Pub. Date: Nov. 16, 2017

(65) Prior Publication Data
US 2019/0168453 A1 Jun. 6, 2019

(51) Int. Cl.
*B29C 64/268* (2017.01)
*B33Y 50/02* (2015.01)
(Continued)

(52) U.S. Cl.
CPC .......... *B29C 64/268* (2017.08); *B29C 64/165* (2017.08); *B29C 64/264* (2017.08); *B29C 64/393* (2017.08); *B33Y 50/02* (2014.12)

(58) Field of Classification Search
CPC ...... B29C 64/268; B29C 64/393; B33Y 50/02
(Continued)

(56) References Cited

U.S. PATENT DOCUMENTS 6,153,142 A 11/2000 Chari et al.
7,515,986 B2 4/2009 Huskamp
(Continued)

FOREIGN PATENT DOCUMENTS

WO WO-2016/051163 A1 4/2016

OTHER PUBLICATIONS

Master Sintering Curve: A Practical Approach to Sintering; Hunghai Su, et al. J. Am. Ceram. Soc., 79 [12] 32117-17 (1996)., (Year: 1996).*

(Continued)

*Primary Examiner* — Robert A Cassity
(74) *Attorney, Agent, or Firm* — Mannava & Kang (57) ABSTRACT

According to an example, a printer may include a warming device to apply energy onto a region of a plurality of regions of a layer of build materials. The printer may also include a controller that may calculate, based upon the region upon which the warming device is to apply energy, an energy curve to be applied to the warming device between occurrences of a plurality of events, in which the energy curve defines timings and levels at which the warming device is to be operated between occurrences of the plurality of events. The controller may also control the warming device to be operated to apply energy onto the region according to the calculated energy curve.

15 Claims, 6 Drawing Sheets

(51) Int. Cl.
*B29C 64/165* (2017.01)
*B29C 64/393* (2017.01)
*B29C 64/264* (2017.01)

(58) Field of Classification Search
USPC ........................................................ 700/299
See application file for complete search history.

(56) References Cited

U.S. PATENT DOCUMENTS

| | | |
|---|---|---|
| 2004/0200816 A1 | 10/2004 | Chung et al. |
| 2007/0241482 A1 | 10/2007 | Grier et al. |
| 2014/0314613 A1 | 10/2014 | Hopkinson et al. |
| 2015/0056319 A1 | 2/2015 | Din et al. |
| 2015/0165681 A1 | 6/2015 | Fish |
| 2015/0190968 A1 | 7/2015 | Griszbacher |
| 2016/0067778 A1* | 3/2016 | Liu .................... B23K 26/0624 419/53 |
| 2016/0332379 A1* | 11/2016 | Paternoster ............. B29C 35/08 |
| 2017/0282455 A1* | 10/2017 | DeFelice ................. B33Y 30/00 |
| 2019/0184494 A1* | 6/2019 | Bennett .................. B23K 26/70 |

OTHER PUBLICATIONS

Tapia, et al., "A Review on Process Monitoring and Control in Metal-Based Additive Manufacturing", Journal of Manufacturing Science and Engineering, vol. 136, Issue 6, Apr. 12, 2014, 2 pages.
International Search Report and Written Opinion dated Feb. 3, 2017, PCT Patent Application No. PCT/US2016/032078, filed May 12, 2016, Korean Intellectual Property Office, 12 pages.

\* cited by examiner

PRINTER WARMING DEVICE CONTROL

CLAIM FOR PRIORITY

The present application is a national stage filing under 35 U.S.C. § 371 of PCT application number PCT/US2016/032078, having an international filing date of May 12, 2016, the disclosure of which is hereby incorporated by reference in its entirety.

BACKGROUND

In three-dimensional (3D) printing, an additive printing process may be used to make three-dimensional solid parts from a digital model. 3D printing may be used in rapid product prototyping, mold generation, mold master generation, and short run manufacturing. Some 3D printing techniques are considered additive processes because they involve the application of successive layers of material. This is unlike traditional machining processes, which often rely upon the removal of material to create the final part. In 3D printing, the building material may be cured or fused, which for some materials may be performed using heat-assisted extrusion, melting, or sintering, and for other materials, may be performed using digital light projection technology.

BRIEF DESCRIPTION OF THE DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

Disclosed herein are a printer, methods for implementing the printer, and a computer readable medium on which is stored instructions corresponding to the methods. The disclosed printer may include a warming device to apply energy onto a region of a plurality of regions of a layer of build materials. The printer may also include a controller that may calculate, based upon the region upon which the warming device is to apply energy, an energy curve to be applied to the warming device between occurrences of a plurality of events, in which the energy curve defines timings and levels at which the warming device is to be operated to apply energy between occurrences of the plurality of events. The controller may also control the warming device to be operated to apply energy onto the region according to the calculated energy curve.

According to an example, the energy curve may be calculated from a master energy curve. In other words, the energy curve to be applied to a warming device may be adapted from the master energy curve based upon the region of a layer of build materials that the warming device is to apply energy. Thus, for instance, the energy curves for different warming devices may vary depending upon the regions on the layer upon which the warming devices are to apply energy because various events may occur at different times with respect to the regions. By way of example, the master energy curve may pertain to a central region of the layer and an event such as a fusing radiation operation from a scanning radiation generator may occur over a first region located near an edge of the layer prior to occurring over the central region. Thus, for instance, the master energy curve may be adapted for a warming device positioned to provide energy to the first region such that the energy from that warming device is applied more quickly than the energy from a warming device positioned to apply energy onto the central region. However, as discussed in greater detail below, the total amount of energy applied by both of these warming devices between the occurrence of common events may be the same or similar with respect to each other.

Through implementation of the methods and printer disclosed herein, energy may be applied at a substantially uniform manner across multiple regions of the layer to, for instance, maintain the temperatures of the build materials in the multiple regions within a predetermined temperature range. In addition, through adaption of a master energy curve as discussed herein, an energy curve that describes the thermal behavior of a control zone (e.g., region) may be dynamically generated without having to calibrate or determine the energy curve in advance for every possible print mode, carriage or recoater speed, etc.

Figure 1A:
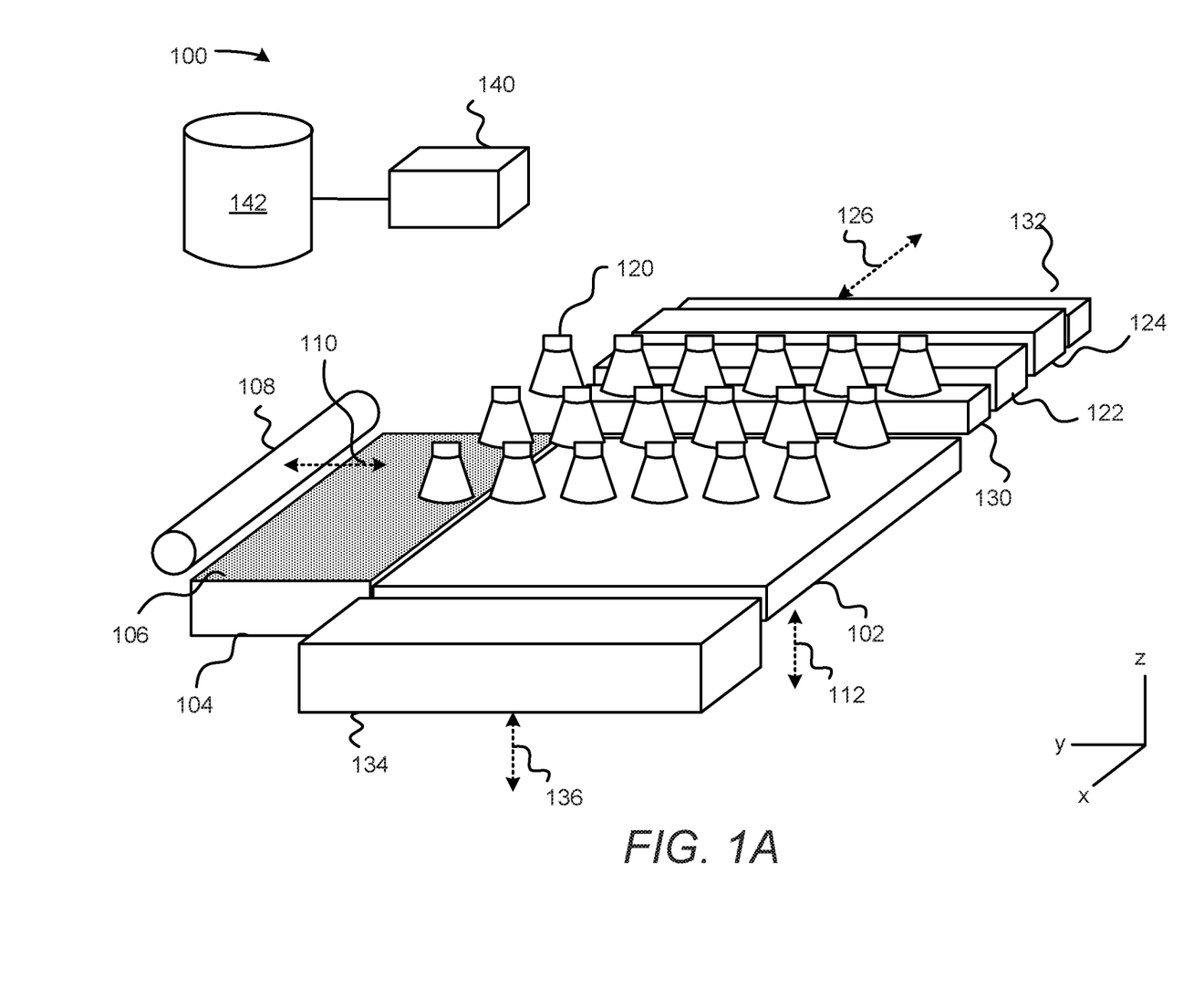
FIG. 1A shows a simplified isometric view of an example three-dimensional (3D) printer for generating, building, or printing three-dimensional parts.

With reference first to FIG. 1A, there is shown a simplified isometric view of an example three-dimensional (3D) printer 100 for generating, building, or printing three-dimensional parts. It should be understood that the 3D printer 100 depicted in FIG. 1A may include additional components and that some of the components described herein may be removed and/or modified without departing from a scope of the 3D printer 100 disclosed herein.

The 3D printer 100 is depicted as including a build area platform 102, a build material supply 104 containing build materials 106, and a recoater 108. The build material supply 104 may be a container or surface that is to position build materials 106 between the recoater 108 and the build area platform 102. The build material supply 104 may be a hopper or a surface upon which the build materials 106 may be supplied, for instance, from a build material source (not shown) located above the build material supply 104. Additionally, or alternatively, the build material supply 104 may include a mechanism to provide, e.g., move, the build materials 106 from a storage location to a position to be spread onto the build area platform 102 or a previously formed layer of build materials 106. For instance, the build material supply 104 may include a hopper, an auger conveyer, or the like. Generally speaking, 3D objects or parts are to be generated from the build materials 106 and the build materials 106 may be formed of any suitable material including, but not limited to, polymers, metals, and ceramics. In addition, the build materials 106 may be in the form of a powder.

The recoater 108 may move in a direction as denoted by the arrow 110, e.g., along the y-axis, over the build material supply 104 and across the build area platform 102 to spread a layer of the build materials 106 over a surface of the build area platform 102. The layer may be formed to a substantially uniform thickness across the build area platform 102. In an example, the thickness of the layer may range from about 90 µm to about 110 µm, although thinner or thicker layers may also be used. For example, the thickness of the layer may range from about 20 µm to about 200 µm, or from about 50 µm to about 200 µm. The recoater 108 may also be returned to a position adjacent the build material supply 104 following the spreading of the build materials 106. In addition, or alternatively, a second build material supply (not shown) may be provided on an opposite side of the build area platform 102 and the recoater 108 may be positioned over the second build material supply after forming the layer of build materials 106. The recoater 108 may be a doctor blade, roller, a counter rotating roller or any other device suitable for spreading the build materials 106 over the build area platform 102.

The 3D printer 100 is also depicted as including a plurality of warming devices 120 arranged in an array above the build area platform 102. Each of the warming devices 120 may be a lamp or other heat source that is to apply heat onto spread layers of the build materials 106, for instance, to maintain the build materials 106 within a predetermined temperature range. According to an example, the warming devices 120 may maintain the temperatures of the build materials 106 at a relatively high temperature that facilitates the selective fusing of the build materials 106. That is, the warming devices 120 may maintain the build materials 106 at a sufficiently high temperature that enables the build materials 106 upon which fusing agent droplets are provided to fuse together upon receipt of fusing radiation without causing the build materials 106 to otherwise fuse together. As shown, each of the warming devices 120 may apply energy, for instance in the form of heat and/or light, onto the areas of the build material layer located directly beneath the warming devices 120 as well as onto areas adjacent to those areas. As such, for instance, certain areas of the build material layer, for instance, the center area, may receive heat from a larger number of warming devices 120 as compared with other areas, for instance, corner areas.

According to an example, the warming devices 120 may be operated in a non-continuous manner such that the build materials 106 may be kept within a predetermined temperature range as various processes are performed on the build materials 106. In addition, the warming devices 120 may be operated in accordance with respective energy curves such that the temperatures of the build materials 106 may be maintained at predefined levels during and between occurrences of various events as discussed in greater detail herein below.

The 3D printer 100 is further depicted as including a first delivery device 122 and a second delivery device 124, which may both be scanned across the build area platform 102 in both of the directions indicated by the arrow 126, e.g., along the x-axis. For instance, the first delivery device 122 may deposit first liquid droplets as the first delivery device 122 is scanned in a first direction 126 along the x-axis and the second delivery device 124 may deposit second liquid droplets as the second delivery device 124 is scanned in an opposite, second direction 126 along the x-axis. The first delivery device 122 and the second delivery device 124 may be thermal inkjet printheads, piezoelectric printheads, or the like, and may extend a width of the build area platform 102. The first delivery device 122 and the second delivery device 124 may each include a printhead or multiple printheads available from the Hewlett Packard Company of Palo Alto, Calif. Although the first delivery device 122 and the second delivery device 124 have each been depicted in FIG. 1A as being formed of separate devices, it should be understood that each of the first delivery device 122 and the second delivery device 124 may be included on the same printhead. For instance, the first delivery device 122 may include a first set of actuators and nozzles in a printhead and the second delivery device 124 may include a second set of actuators and nozzles in the printhead.

In other examples in which the first delivery device 122 and the second delivery device 124 do not extend the width of the build area platform 102, the first delivery device 122 and the second delivery device 124 may also be scanned along the y-axis to thus enable the first delivery device 122 and the second delivery device 124 to be positioned over a majority of the area above the build area platform 102. The first delivery device 122 and the second delivery device 124 may thus be attached to a moving XY stage or a translational carriage (neither of which is shown) that is to move the first delivery device 122 and the second delivery device 124 adjacent to the build area platform 102 in order to deposit respective liquids in predetermined areas of a layer of the build materials 106.

Although not shown, the first delivery device 122 and the second delivery device 124 may each include a plurality of nozzles through which the respective liquid droplets are to be ejected onto the build material layer. The first delivery device 122 may deposit a first liquid and the second delivery device 124 may deposit a second liquid. The first liquid and the second liquid may both be fusing agents, may both be detailing agents, or one may be a fusing agent and the other may be detailing agent. A fusing agent may be a liquid that is to absorb fusing radiation (e.g., in the form of light and/or heat) to cause the build materials 106 upon which the fusing agent has been deposited to fuse together when the fusing radiation is applied. A detailing agent may be a liquid that may absorb significantly less of the fusing radiation as compared with the fusing agent. In one example, the detailing agent may prevent or significantly reduce the fusing together of the build materials 106 upon which the detailing agent has been deposited. In other examples, the detailing agent may be implemented to provide coloring to exterior portions of the build materials 106 that have been fused together.

The first liquid and the second liquid may also include various additives and/or catalysts that either enhance or reduce radiation absorption. For instance, the first liquid may include a radiation absorbing agent, i.e., an active material, metal nanoparticles, or the like. The first liquid and the second liquid may also include any of a co-solvent, a surfactant, a biocide, an anti-kogation agent, a dispersant, and/or combinations thereof.

Although not shown, the 3D printer 100 may include additional delivery devices, e.g., printheads, that may deposit multiple liquids having different radiation absorption properties with respect to each other. By way of example, the multiple liquids may have different colors with respect to each other, may have different chemical compositions (e.g., different reactants and/or catalysts) with respect to each other, or the like. In the example in which the 3D printer 100 may deposit multiple liquids, the 3D printer 100 may include multiple printheads, in which each of the multiple printheads may deposit a liquid having a different radiation absorption property with respect to the other liquids.

Following deposition of the first liquid droplets and/or the second liquid droplets onto selected areas of the layer of the build materials 106, a first fusing radiation generator 130 and/or a second fusing radiation generator 132 may be implemented to apply fusing radiation onto the layer of build materials 106. Particularly, the fusing radiation generator(s) 130, 132 may be activated and moved across the layer of build materials 106, for instance, along the directions indicated by the arrow 126, to apply fusing radiation in the form of light and/or heat onto the build materials 106. Examples of the fusing radiation generators 130, 132 may include UV, IR or near-IR curing lamps, IR or near-IR light emitting diodes (LED), halogen lamps emitting in the visible and near-IR range, or lasers with desirable electromagnetic wavelengths. The types of fusing radiation generators 130, 132 may depend, at least in part, on the type of active material used in the liquid(s). According to an example, the first delivery device 122, the second delivery device 124, the first fusing radiation generator 130, and the second fusing radiation generator 132 may be supported on a carriage (not shown) that may be scanned over the build area platform 102 in the directions denoted by the arrow 126.

Following application of the radiation to fuse selected sections of the build materials 106 together, the build area platform 102 may be lowered as denoted by the arrow 112, e.g., along the z-axis. In addition, the recoater 108 may be moved across the build area platform 102 to form a new layer of build materials 106 on top of the previously formed layer. Moreover, the first delivery device 122 may deposit first liquid droplets and the second delivery device 124 may deposit second liquid droplets onto respective selected areas of the new layer of build materials 106. The above-described process may be repeated until a predetermined number of layers have been formed to fabricate a green body of a desired 3D part.

Additionally, following a liquid deposition operation across a build material layer or following multiple liquid deposition operations across multiple build material layers, the first delivery device 122 and the second delivery device 124 may be positioned adjacent to a wiping mechanism 134. The wiping mechanism 134 may wipe the nozzles of the first delivery device 122 and the second delivery device 124, as well as the nozzles of additional delivery devices if included in the 3D printer 100. The wiping mechanism 134 may be moved to a position in which a surface, such as a cleaning web (not shown), of the wiping mechanism 134 is in contact with the exterior surfaces of the nozzles. The wiping mechanism 134 may be moved in the z-direction as noted by the arrow 136 to remove debris such as, build materials 106, liquid, dust, etc., that may be in contact with the exterior surfaces of the first delivery device 122 and the second delivery device 124, to maintain the delivery devices 122, 124 at or above desired performance levels.

As further shown in FIG. 1A, the 3D printer 100 may include a controller 140 that may control operations of the build area platform 102, the build material supply 104, the recoater 108, the warming devices 120, the first delivery device 122, the second delivery device 124, the fusing radiation generators 130, 132, and the wiping mechanism 134. Particularly, for instance, the controller 140 may control actuators (not shown) to control various operations of the 3D printer 100 components. The controller 140 may be a computing device, a semiconductor-based microprocessor, a central processing unit (CPU), an application specific integrated circuit (ASIC), and/or other hardware device. Although not shown, the controller 140 may be connected to the 3D printer 100 components via communication lines.

The controller 140 is also depicted as being in communication with a data store 142. The data store 142 may include data pertaining to a 3D part to be printed by the 3D printer 100. For instance, the data may include the locations in each build material layer that the first delivery device 122 is to deposit a first liquid and that the second delivery device 124 is to deposit a second liquid to form the green body of the 3D part. In one example, the controller 140 may use the data to control the locations on each of the build material layers that the first delivery device 122 and the second delivery device 124 respectively deposit droplets of the first and second liquids.

Figure 1B:
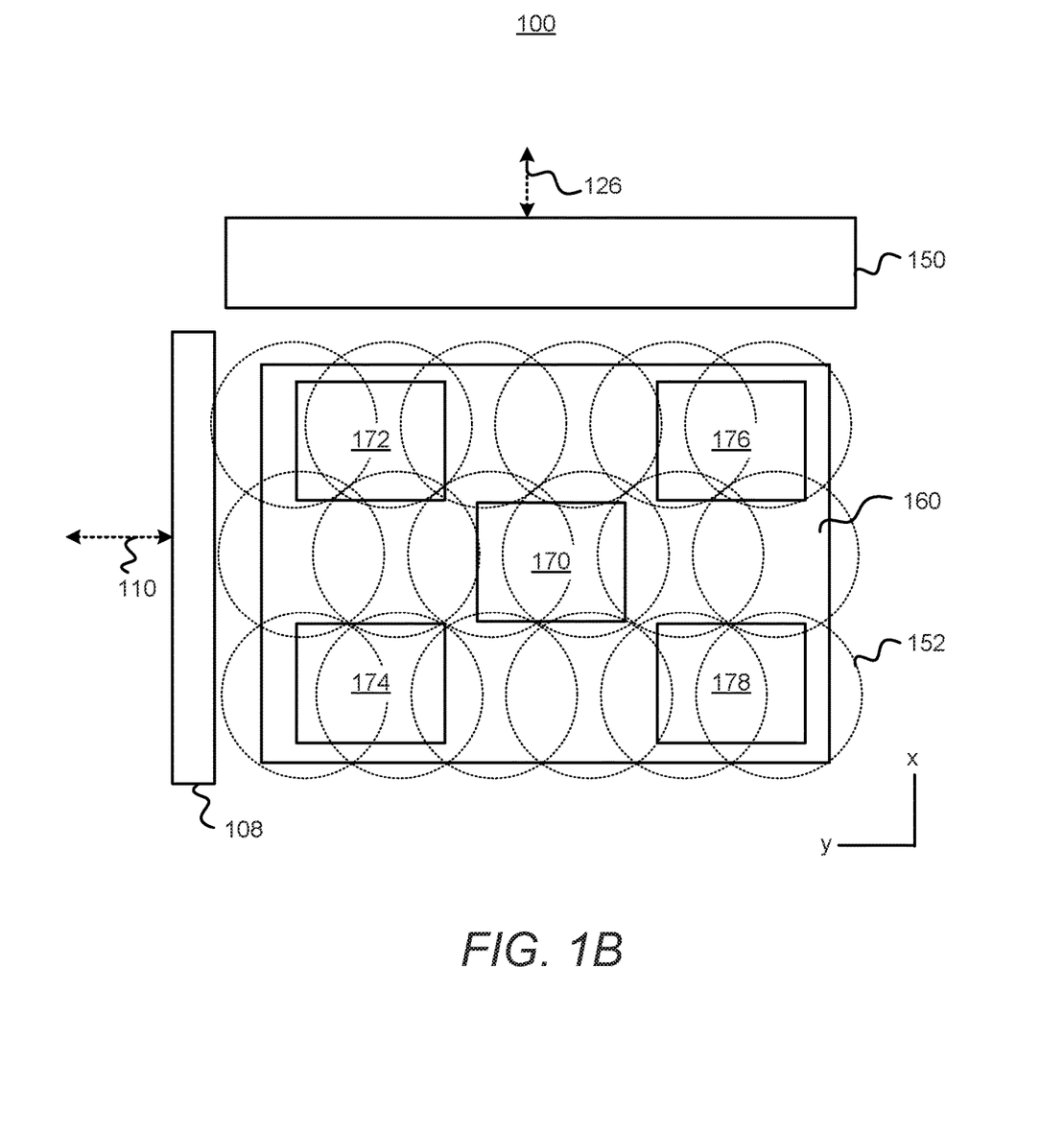
FIG. 1B shows a simplified block diagram of a top view of the 3D printer depicted in FIG. 1A.

With reference now to FIG. 1B, there is shown a simplified block diagram of a top view of the 3D printer 100 depicted in FIG. 1A. A layer 160 of build materials 106 is depicted as being formed on top of the build area platform 102 (not shown). In addition, the recoater 108 is depicted as being movable across the layer 160 in the directions denoted by the arrow 110 and an assembly 150 is depicted as being movable across the layer 160 in the directions denoted by the arrow 126. The assembly 150 may include the first delivery device 122, the second delivery device 124, the first fusing radiation generator 130, and the second fusing radiation generator 132. For instance, the assembly 150 may represent a carriage upon which these components are supported.

Also shown in FIG. 1B are a plurality of circles 152 shown with dotted lines. Each of the circles 152 may represent a location on the surface of the layer 160 at which energy from a warming device 120 may respectively be focused. That is, each of the circles 152 may represent a location at which the energy from a warming device 120 may primarily be directed. It should be understood that FIG. 1B depicts a simplified illustration and that the warming devices 120 may apply energy in a different arrangement from the shown arrangement and there may be a larger or lesser number of warming devices 120.

According to an example, the controller 140 may control each of the warming devices 120 individually through application of respective pulse width modulation (PWM) signals to the warming devices 120. Thus, for instance, the controller 140 may control when the warming devices 120 are activated, the durations at which the warming devices 120 are activated, and the amounts of energy outputted by the warming devices 120 by controlling the PWM signals applied to the warming devices 120. As discussed in greater detail herein, the controller 140 may control the warming devices 120 according to respective energy curves.

By way of example, the controller 140 may individually control the warming devices 120 such that the temperatures of the build materials 106 across the layer 160 are substantially uniform with each other, e.g., within about ±1° C. with respect to each other. In addition, the controller 140 may control the warming devices 120 such that the temperatures of the build materials 106 remain substantially uniform as various events occur in the 3D printer 100. The various events may include events that may cause the temperature of the build materials 106 to change, for instance, movement of the recoater 108 across the layer 160, movement of the assembly 150 across the layer 160, application of fusing radiation by either or both of the first fusing generator 130 and the second fusing generator 132, passage of time over which additional heat is not applied to the layer 160, etc. Thus, for instance, the controller 140 may control the warming devices 120 to reduce and/or cease application of energy during and shortly after application of fusing radiation by either or both of the first fusing radiation generator 130 and the second fusing radiation generator 132.

Also shown in FIG. 1B are a plurality of boxes 170-178 that may represent various regions on the layer 160 to illustrate that the events may occur at different times for the different regions. For instance, the recoater 108 may be moved over the regions 172 and 174 prior to being moved over the regions 170, 176, and 178 during a recoater 108 scanning operation. In addition, the assembly 150 may be moved over the regions 172 and 176 prior to being moved over the regions 179, 174, and 178. Moreover, a pair of events, such as a recoater 108 scanning operation and a fusing radiation application operation (by a fusing radiation generator 130 on the assembly 150), may occur at different time intervals for each of the regions 170-178. For instance, the fusing radiation generator 130 may traverse the second region 172 at a first time interval following traversal of the recoater 108 over the second region 172. Likewise, the fusing radiation generator 130 may traverse the third region 174 at a second time interval following traversal of the recoater 108 over the third region 174. As the regions 172 are and 174 are in different locations with respect to the recoater 108 and the assembly 150, the first time interval may differ from the second time interval.

As discussed in greater detail herein below, the controller 140 may calculate and apply different energy curves for the warming devices 120 based upon the regions 170-178 over which the warming devices 120 are to apply energy. In other words, the controller 140 may calculate the different energy curves for the warming devices 120 by taking into account the different spatial, temporal, and speed characteristics of events occurring on the different regions 170-178. More particularly, the controller 140 may calculate the different energy curves for the warming devices 120 from a master energy curve based upon the regions upon which the warming devices 120 are to respectively apply the majority of their energy. In one example, the controller 140 may calculate a respective energy curve for each of the warming devices 120. In another example, the controller 140 may calculate energy curves for respective groups of warming devices 120 that apply heat onto particular regions.

Figure 2:
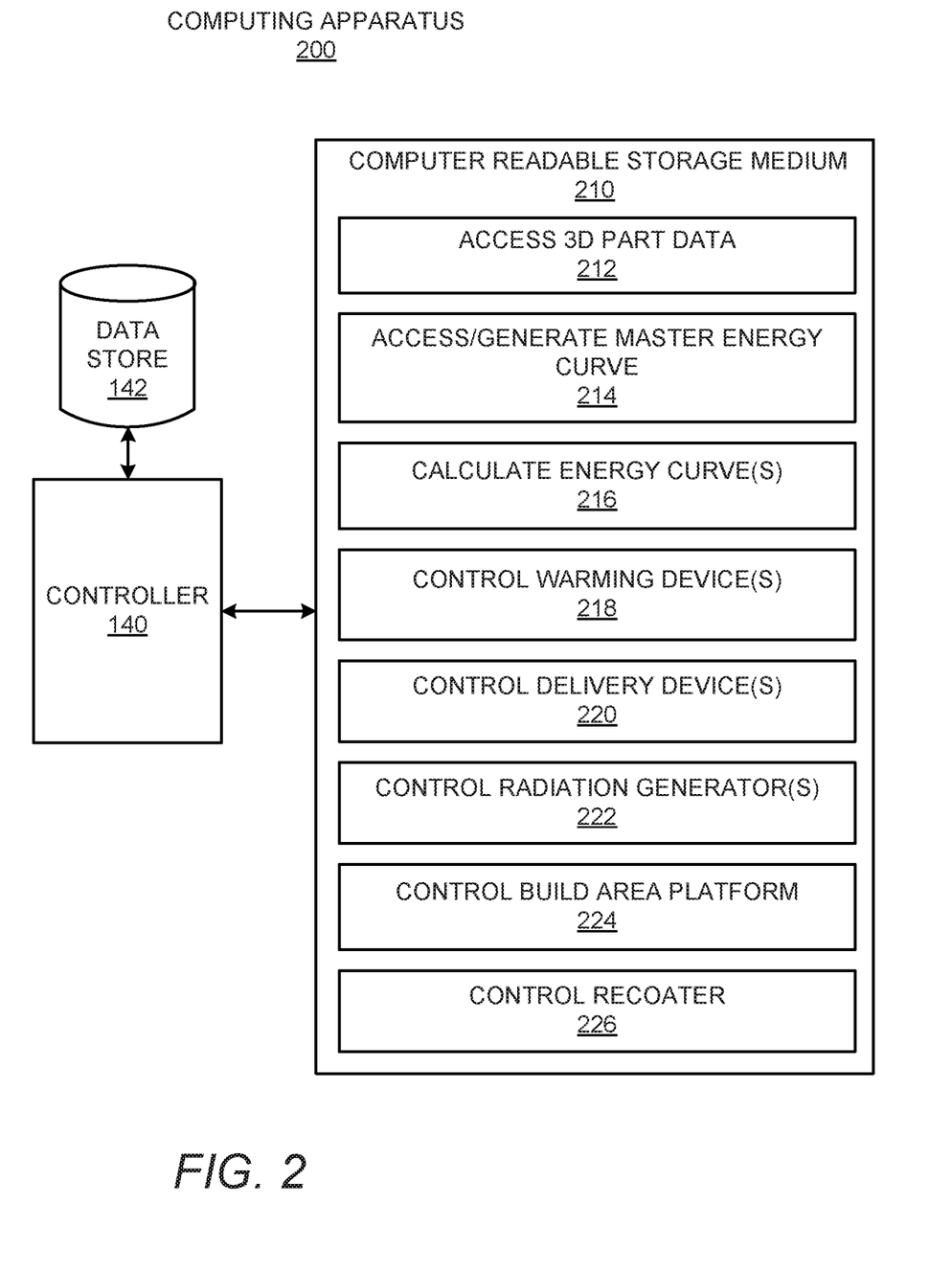
FIG. 2 shows a simplified block diagram of an example computing apparatus that may be implemented in the 3D printer depicted in FIG. 1A.

Turning now to FIG. 2, there is shown a simplified block diagram of an example computing apparatus 200. According to an example, the computing apparatus 200 may be implemented as part of the 3D printer 100. For instance, the computing apparatus 200 may be a command module or other control system of the 3D printer 100. In another example, the computing apparatus 200 may be separate from the 3D printer 100, such as a personal computer, laptop computer, server computer, or the like. It should be understood that the computing apparatus 200 depicted in FIG. 2 may include additional components and that some of the components described herein may be removed and/or modified without departing from a scope of the computing apparatus 200 disclosed herein.

The computing apparatus 200 is shown as including a controller 140 and a data store 142, which may be the same as the controller 140 and the data store 142 depicted in and described above with respect to FIG. 1A. As such, the controller 140 and the data store 142 depicted in FIG. 2 are not described in detail and instead, the descriptions of the controller 140 and the data store 142 provided above with respect to the 3D printer 100 are intended to also describe these components with respect to the computing apparatus 200.

The computing apparatus 200 may also include a computer readable storage medium 210 on which is stored machine readable instructions 212-226 that the controller 140 may execute. More particularly, the controller 140 may fetch, decode, and execute the instructions 212-226 to access data pertaining to a 3D part to be printed 212, access/generate a master energy curve 214, calculate an energy curve or multiple energy curves 216, control a warming device or multiple warming devices 218, control a delivery device or multiple delivery devices 220, control a radiation generator or multiple radiation generators 222, control a build area platform 224, and control a recoater 226. As an alternative or in addition to retrieving and executing instructions, the controller 140 may include one or more electronic circuits that include components for performing the functionalities of the instructions 212-226. In any regard, and as discussed above, the controller 140 may communicate instruction signals to the various components of the 3D printer 100 via communication lines such that the components may operate in the manners described herein.

The computer readable storage medium 210 may be any electronic, magnetic, optical, or other physical storage device that contains or stores executable instructions. Thus, the computer readable storage medium 210 may be, for example, Random Access Memory (RAM), an Electrically Erasable Programmable Read-Only Memory (EEPROM), a storage device, an optical disc, and the like. The computer readable storage medium 210 may be a non-transitory machine-readable storage medium, where the term "non-transitory" does not encompass transitory propagating signals.

Figure 3:
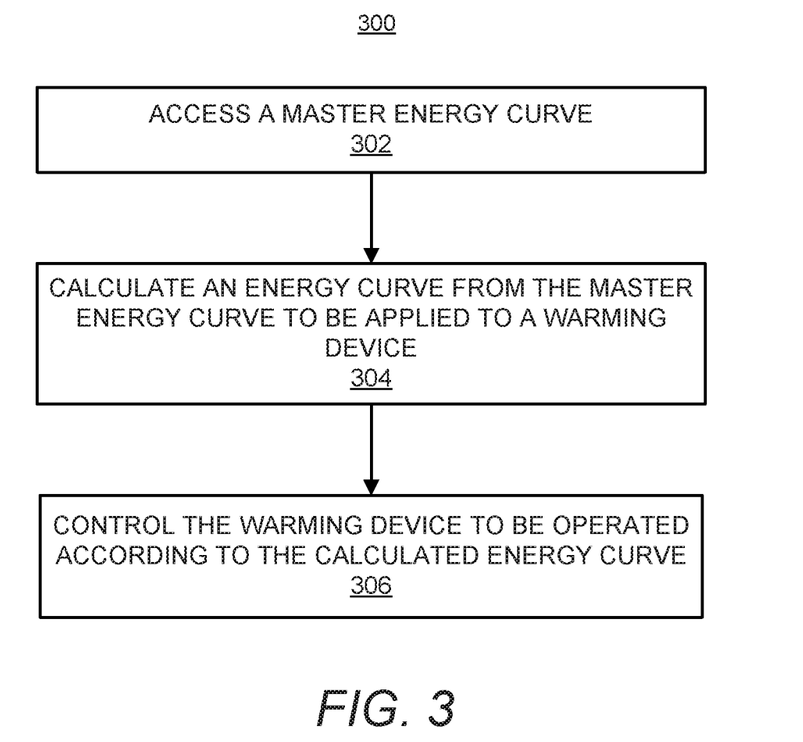
FIGS. 3 and 4, respectively, depict example methods for controlling a warming device or devices based upon a calculated energy curve or curves.
Figure 4:
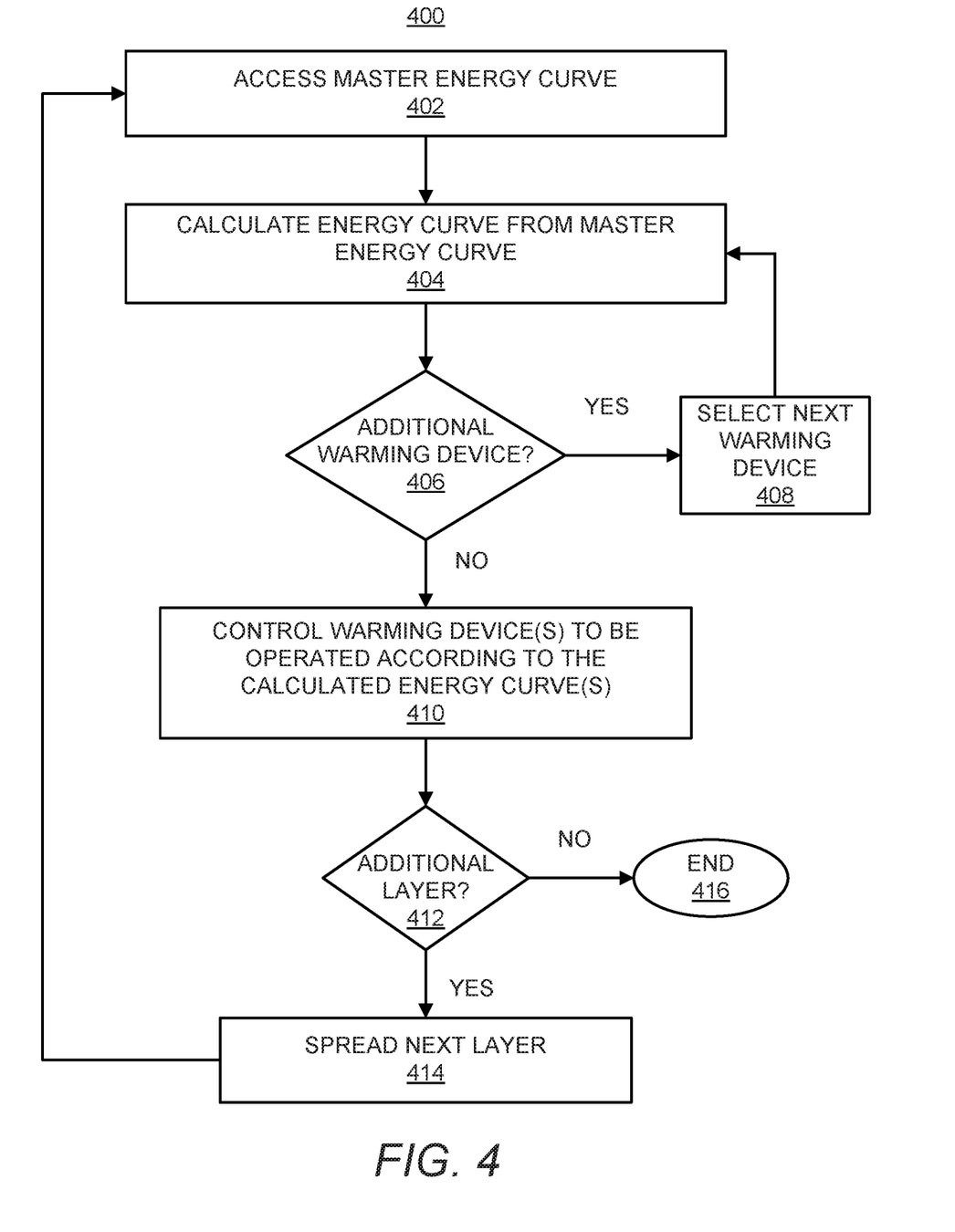

Various manners in which the computing apparatus 200 may be implemented are discussed in greater detail with respect to the methods 300 and 400 respectively depicted in FIGS. 3 and 4. Particularly, FIGS. 3 and 4, respectively, depict example methods 300 and 400 for controlling a warming device or warming devices based upon a calculated energy curve or calculated energy curves. It should be apparent to those of ordinary skill in the art that the methods 300 and 400 may represent generalized illustrations and that other operations may be added or existing operations may be removed, modified, or rearranged without departing from the scopes of the methods 300 and 400.

The descriptions of the methods 300 and 400 are made with reference to the 3D printer 100 illustrated in FIGS. 1A and 1B and the computing apparatus 200 illustrated in FIG. 2 for purposes of illustration. It should, however, be clearly understood that 3D printers and computing apparatuses having other configurations may be implemented to perform either or both of the methods 300 and 400 without departing from the scopes of the methods 300 and 400.

Prior to execution of either of the methods 300 and 400 or as parts of the methods 300 and 400, the controller 140 may execute instructions 212 stored on the computer readable medium 210 to access data pertaining to a 3D part that is to be printed. By way of example, the controller 140 may access data stored in the data store 142 pertaining to a 3D part that is to be printed. The controller 140 may determine the number of layers of build material 106 that are to be formed and the locations at which first liquid droplets and/or second liquid droplets are to be deposited on each of the respective layers of build material 106 in order to print the 3D part. The controller 140 may further determine when each of the recoater 108, the first delivery device 122, the second delivery device 124, the first fusing radiation generator 130, and the second fusing radiation generator 132 are to be moved across the build area platform 102 during each layer processing operation. In other examples, however, a processing device (not shown) outside of the 3D printer 100 may execute instructions to access the 3D part data and to make these determinations. In these examples, the processing device may communicate this information to the controller 140 and the controller 140 may implement this information in executing either or both of the methods 300 and 400.

With reference first to FIG. 3, at block 302, a master energy curve may be accessed. The controller 140 may access a previously generated master energy curve from the data store 142 or may generate the master energy curve in any of the manners discussed below. The master energy curve may define how much energy and when the energy is to be supplied by a warming device 120 during a layer processing operation. For instance, the master energy curve may define these control features for a particular warming device 120, such as the warming device 120 that is to control the amount of energy delivered to a particular region of the layer 160 of build materials 106, for instance, a control region. By way of particular example, the master energy curve may control the operations of a warming device 120 that is to deliver energy onto a central region 170 of the layer 160. In this particular example, the control region is the central region 170 of the layer 160 and the warming device 120 that is to apply energy onto the central region 170 may be considered a control warming device; however, in other examples, the control region may be a different region of the layer 160 and the control warming device may supply energy to the different region.

According to an example, the master energy curve may identify the pulse width modulation signals that the controller 140 is to supply to the warming device 120 over a period of time corresponding to the layer processing operation. Particularly, the master energy curve may identify the timing, strength, and duration at which the controller 140 is to supply the pulse width modulation signals to the warming device 120 to maintain the build materials 106 in the central region 170 within a predetermined temperature range during the layer processing operation. According to an example, the master energy curve may be generated based upon an input temperature of the build materials, a heat capacity of the build materials, a thickness of the build materials, a thermal conductivity of the build materials, or a combination thereof.

Figure 5A:
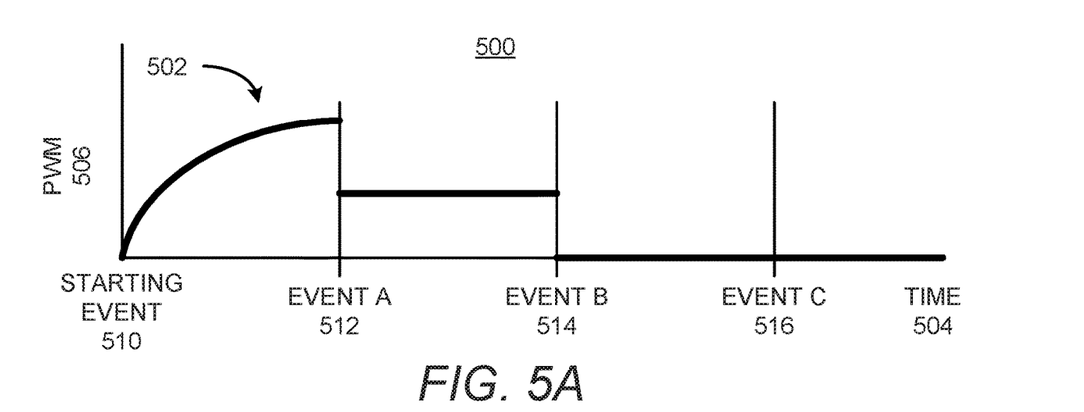
FIGS. 5A-5C, respectively, depict an example master energy curve and example energy curves calculated form the master energy curve.

An example of a master energy curve 502 is illustrated in the graph 500 depicted in FIG. 5A. As shown, the graph 500 may include a first axis that tracks time 504 and a second axis that tracks the pulse width modulation (PWM) applied to a warming device 120. In other words, the graph 500 illustrates the master curve 502 as identifying the timing, intensity, and duration at which PWM 506 signals are to be delivered to the warming device 120. The graph 500 also depicts various events 510-516 that may occur during a time period, which may track a layer processing operation. The various events 510-516 may include the lapse of various times periods. For instance, the first event 512 may denote the passage of a first time period, the second event 514 may denote the passage of a second time period, and the third event 516 may denote the passage of a third time period, in which a layer processing operation occurs until a fourth time period expires, at which time the starting event 510 may be repeated.

In addition or alternatively, the various events 510-516 may denote various operations performed by the components of a 3D printer 100. For instance, the starting event 510 may denote an event in which the recoater 108 is moved across the build area platform 102 to spread a layer 160 of build materials 106 onto the build area platform 102 or onto a previously spread layer 160. The first event 512 may denote an event in which the first fusing radiation generator 130 applies fusing radiation onto the layer 160 as the first fusing radiation generator 130 is moved over the layer 160. The second event 514 may denote an event in which the second fusing radiation generator 132 applies fusing radiation onto the layer as the second fusing radiation generator 132 is moved over the layer 160. The third event 516 may denote movement of the build area platform 102 to enable a next layer (not shown) of build materials 106 to be formed.

As shown, between the starting event 510 and the first event 512, the controller 140 may output an increasing amount of PWM 506 signals to cause a warming device 120 to output energy, e.g., in the form of heat and/or light, until the first event 512 occurs. At that time, the controller 140 may reduce the PWM 506 signals sent to the warming device 120 to cause the warming device 120 to output a lesser amount of energy between occurrence of the first event 512 and the second event 514. In addition, following the second event 514 and through occurrence of the third event 516, the controller 140 may cease outputting PWM 506 signals to the warming device 120 such that the warming device 120 ceases applying energy onto the region corresponding to the warming device 120.

In one regard, application of energy corresponding to the master energy curve 502 may cause the temperatures of the build materials 106 in the region affected by the warming device 120 to remain within a predetermined temperature range during the layer processing operation. That is, for instance, after formation of the layer 160 (starting event 510), the warming device 120 may apply a greater amount of energy as the temperature of the build materials 106 may be well below the predetermined temperature range. However, after the first event 512 (first fusing radiation application), the build materials 106 may be near the predetermined temperature range and thus, the warming device 120 may apply a smaller amount of energy. In addition, after the second and third events 514 and 516, (second fusing radiation application), the build materials 106 may be within the predetermined temperature range and thus, the warming device 120 may not apply additional energy onto the build materials 106. The predetermined temperature range may depend upon thermal properties of the build materials 106, for instance.

According to an example, different master energy curves may be generated for different print modes. For instance, a first master energy curve may be generated for a draft print mode and a second master energy curve may be generated for a high quality print mode. Moreover, different master energy curves may be generated for different layers 160 of the build materials 106. For instance, a first master energy curve may be generated for a first layer 160 applied onto the build area platform 102, which may be a sacrificial layer on which liquid droplets may not be deposited and a second master energy curve may be generated for the remaining layers formed on top of the first layer.

At block 302, therefore, the controller 140 may execute the instructions 214 to access/generate the master energy curve 502, in which the accessed/generated master energy curve 502 may depend upon the selected print mode and/or the layer that is currently being processed.

At block 304, an energy curve may be calculated from the master energy curve to be applied to a warming device 120 based upon a region of a plurality of regions on the layer 160 of build materials that the warming device 120 is to apply energy. According to an example, a separate energy curve may be calculated for each of the warming devices 120 in an array of warming devices. In another example, a separate energy curve may be calculated for respective groups of warming devices 120 that are to apply energy onto common regions of the layer 160. In any regard, the controller 140 may execute the instructions 216 to calculate the energy curve(s) such that the same amount of total energy is applied to each of the regions 170-176 of the layer 160 as the amount of energy denoted by the master energy curve 502.

That is, the controller 140 may calculate the energy curve for the warming device 120 (or devices 120) that is to supply energy to the second region 172 to include that the total amount of energy applied to the second region 172 between the starting event 510 and the first event 512 be the same as the total amount of energy applied to a first region 170 between those events 510, 512. However, as the timing at which the events 510-516 occur for the different regions 170-178 may differ from each other, e.g., the first fusing radiation generator 130 may scan over the second region 172 prior to scanning over the first region 170, the energy curve for that warming device 120 (or warming devices 120) may be calculated by adapting the master energy curve. According to an example, the energy curves for the warming devices 120 may be calculated by adapting the master energy curve based upon predicted temperature changes at the regions 170-178 that the warming devices 120 are respectively to apply energy. For instance, the temperature changes at the regions 170-178 may be predicted based upon temperature changes that have historically occurred at those regions 170-178. That is, the controller 140 may predict the temperature changes based upon how the temperatures have historically changed.

Figure 5B:
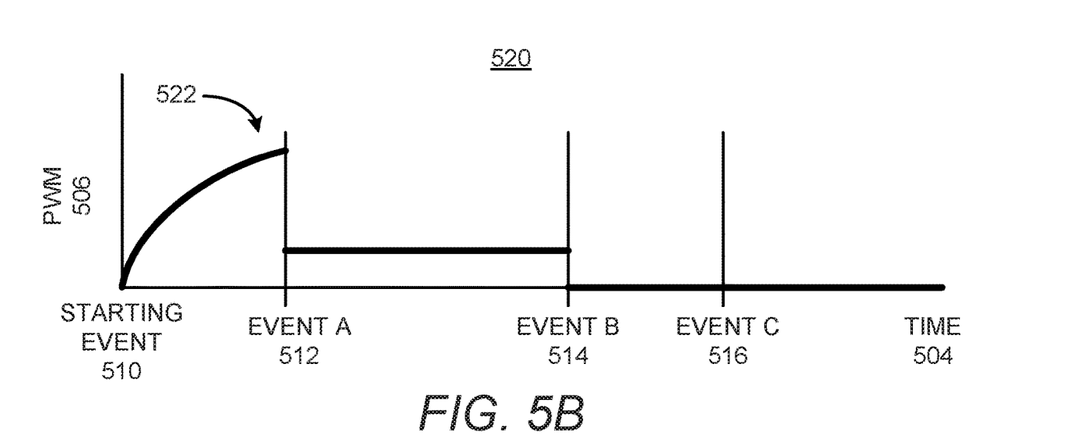

An example of a calculated energy curve 522 for a warming device 120 that is to provide energy onto the second region 172 is depicted in the graph 520 shown in FIG. 5B. As shown in FIG. 5B, the timing at which the first event 512 occurs for the warming device 120 may be sooner than when the first event 512 occurs for the master energy curve 502. As discussed above, in the example in which the first event 512 is the application of the first fusing radiation as the first fusing radiation generator 130 is scanned over the layer 160, as shown in FIG. 1B, the first fusing radiation generator 130 may be moved over the second region 172 prior to being moved over the first region 170. However, the difference in time between the first event 512 and the second event 514 over the second region 172 may be greater than the difference in time between the first event 512 and the second event 514 over the first region 172 because, as shown in FIG. 1B, when the assembly 150 reaches the bottom of the layer 160 and moves back in the direction denoted by the arrow 126, the assembly 150 will travel over the first region 170 prior to traveling over the second region 172.

In addition, in order to apply the same amount of energy onto the second region 172 between the starting event 510 and the first event 512 as the master energy curve 502, the calculated energy curve 522 may include a relatively sharper increase in the application of energy than the master energy curve 502. That is, because there may be shorter window of time in which energy may be applied between the starting event 510 and the first event 512 for the second region 172, the energy may be applied at a faster rate and at a higher intensity level between the starting event 510 and the first event 512.

Likewise, because the amount of time between the first event 512 and the second event 514 may be longer than that of the master energy curve 502, the calculated energy curve 522 may include application of a lower intensity of energy during that time. As discussed above, the controller 140 may calculate the amount of energy to be applied during that time to be equal to the amount of energy denoted in the master energy curve 502 between the occurrences of similar events.

Figure 5C:
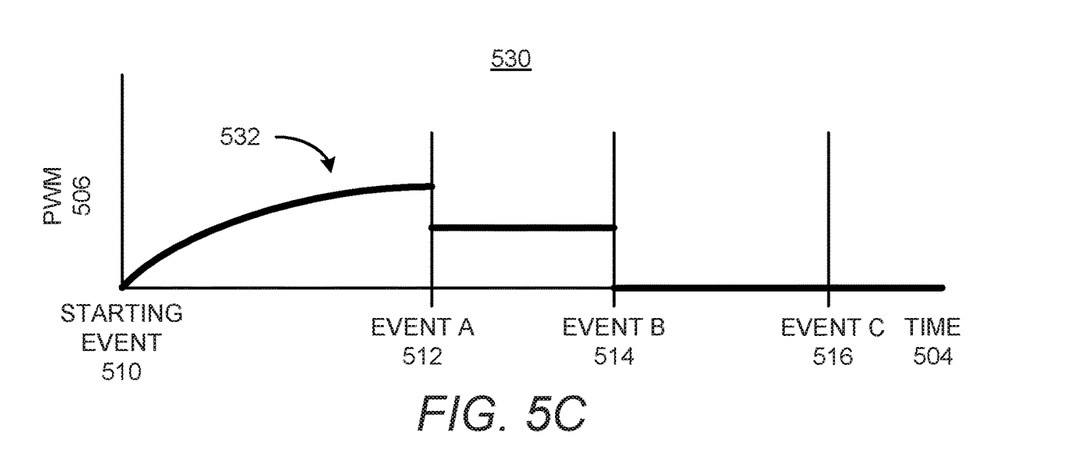

An example of a calculated energy curve 532 for another warming device 120 that is to provide energy onto the third region 174 is depicted in the graph 530 shown in FIG. 5C. As shown in the graph 530, the timing at which the events 512-516 occur may differ from the timing at which the events 512-516 occur in the graphs 500 and 520 due the different positioning of the third region 174 with respect to the first region 170 and the second region 172. Additional energy curves may be calculated for the warming devices 120 that are to supply energy to other regions across the layer 160.

Although the calculated energy curves may differ for the warming devices 120 depending upon the regions upon which the warming devices 120 are to supply energy, it should be understood that the total amounts of energy supplied between respective occurrences of the events 510-516 may be equivalent to that of the master energy curve 502. By way of example in which the master energy curve 502 includes the application of 1 kJ of energy between the starting event 510 and the first event 512 over a duration of 2 seconds, a first energy curve 522 may also include the application of 1 kJ of energy between the starting event 510 and the first event 512, however, over a shorter duration of time, e.g., 1 second.

At block 306, the controller 140 may control the warming device 120 to be operated according to the calculated energy curve. For instance, the controller 140 may execute the instructions 218 to apply PWM signals to the warming device 120 according to the calculated energy curve. In addition or alternatively, the controller 140 may execute the instructions 218 to apply PWM signals to multiple warming devices 120 according to their respective calculated energy curves.

With reference now to FIG. 4, at block 402, the controller 140 may execute the instructions 214 to access/generate a master energy curve 502. As discussed above, the master energy curve 502 may depend upon the selected print mode and/or the layer that is currently being processed. In addition, the controller 140 may access/generate the master energy curve 502 in any of the manners discussed above with respect to block 302 in FIG. 3.

At block 404, the controller 140 may execute the instructions 216 to calculate an energy curve from the master energy curve to be applied to a warming device 120 based upon a region of a plurality of regions on the layer 160 of build materials that the warming device 120 is to apply energy. The controller 140 may calculate the energy curve for the warming device 120 as discussed above with respect to block 304 in FIG. 3.

At block 406, the controller 140 may determine whether an energy curve is to be calculated for an additional warming device 120. In response to a determination that the energy curve for an additional warming device 120 is to be calculated, the controller 140 may select a next warming device 120 as indicated at block 408. In addition, the controller 140 may repeat blocks 404-408 to calculate energy curves for any additional warming devices 120. For instance, the controller 140 may repeat blocks 404-408 for each of the remaining warming devices 120 in the 3D printer 100.

At block 410, the controller 140 may execute the instructions 218 to control the warming device(s) 120 according to the calculated energy curve(s). Thus, for instance, the controller 140 may communicate respective PWM signals to each of a plurality of warming devices 120 according to the respective energy curves, such that, respective regions affected by the warming devices 120 receive substantially similar amounts of energy between occurrences of various events with respect to the master energy curve and each other.

At block 412, the controller 140 may determine whether an additional layer of build materials 106 is to be formed. The controller 140 may make this determination, for instance, based upon accessed information regarding the 3D part to be printed. In response to a determination that an additional layer is to be formed, a next layer of build materials 106 may be spread on top of the layer 160, as indicated at block 414. For instance, the controller 140 may execute the instructions 224 to control the build area platform 102 to be moved downward and may execute the instructions 226 to control the recoater 108 to spread additional build materials 106 across the layer 160. In addition, blocks 402-414 may be repeated until no additional layers are to be formed, at which point the method 400 may end, as indicated at block 416. Although not explicitly described with respect to the methods 300 and 400, the controller 140 may also execute the instructions 220 to control the first and second delivery devices 122, 124 to selectively deposit fluid droplets across the layer 160, for instance, immediately prior to application of fusing radiation onto the layer 160.

Some or all of the operations set forth in the methods 300 and 400 may be contained as utilities, programs, or subprograms, in any desired computer accessible medium. In addition, the methods 300 and 400 may be embodied by computer programs, which may exist in a variety of forms both active and inactive. For example, they may exist as machine readable instructions, including source code, object code, executable code or other formats. Any of the above may be embodied on a non-transitory computer readable storage medium. Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure. What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A printer comprising:
    a plurality of warming devices to apply energy onto a plurality of regions of a layer of build materials between occurrences of a plurality of events;
    a controller to:
        calculate a first energy curve for a first warming device of the plurality of warming devices and a second energy curve for a second warming device of the plurality of warming devices, wherein the first energy curve defines timings and levels at which the first warming device is to be operated to apply energy onto a first region of the plurality of regions to maintain a temperature of the first region within a predetermined temperature range without causing the build materials in the first region to fuse together, and wherein the second energy curve defines timings and levels at which the second warming device is to be operated to apply energy onto a second region of the plurality of regions to maintain a temperature of the second region within the predetermined temperature range without causing the build materials in the second region to fuse together; and
        control the first warming device and the second warming device to be operated to apply energy onto the first region and the second region, respectively, according to the first energy curve and the second energy curve.

2. The printer according to claim 1, wherein the controller is to calculate the first energy curve and the second energy curve from a master energy curve, and wherein the master energy curve defines timings and levels at which a control warming device is to be operated to apply energy onto the build materials in a control region to maintain the build materials in the control region within the predetermined temperature range without causing the build materials in the control region to fuse together.

3. The printer according to claim 2, wherein the master energy curve is generated based upon an input temperature of the build materials, a heat capacity of the build materials, a thickness of the build materials, or a thermal conductivity of the build materials.

4. The printer according to claim 1, wherein the controller is to calculate the first energy curve and the second energy curve to be applied to the first warming device and the second warming device from one of a first master energy curve and a second master energy curve, wherein the first master energy curve corresponds to a first selected print mode and the second master energy curve corresponds to a second selected print mode.

5. The printer according to claim 1,
    wherein a pair of the plurality of events occur over a first time interval over the first region and between a second time interval over the second region, and wherein the first energy curve includes a same amount total energy over the first time interval as the second energy curve over the second time interval.

6. The printer according to claim 1, wherein the plurality of events comprise a recoater movement operation and a fusing radiation application operation.

7. The printer according to claim 1, wherein the plurality of events comprise a lapse of a first time period and a lapse of a second time period.

8. The printer according to claim 1, wherein the controller is to calculate the first energy curve for the first warming device and the second energy curve for the second warming device to be operated in a first print mode, and wherein the controller is further to:
    calculate the first energy curve for the first warming device and the second energy curve for the second warming device to be operated in a second print mode;
    identify whether the first print mode or the second print mode has been selected; and control the first warming device and the second warming device to be operated based upon whether the first print mode or the second print mode has been selected.

9. A method comprising:
- accessing, by a controller, a master energy curve, wherein the master energy curve defines timings and levels at which a control warming device is to apply energy onto a control region of a plurality of regions of a layer of build materials to maintain a temperature of the control region within a predetermined temperature range between occurrences of a plurality of events without causing the build materials in the control region to fuse together;
- calculating, by the controller, a first energy curve for a first warming device of a plurality of warming devices from the accessed master energy curve, wherein the first energy curve defines timings and levels at which the first warming device is to be operated to apply energy onto a first region of the plurality of regions to maintain a temperature of the first region within the predetermined temperature range without causing the build materials in the first region to fuse together;
- calculating, by the controller, a second energy curve for a second warming device of the plurality of warming devices from the accessed master energy curve, wherein the second energy curve defines timings and levels at which the second warming device is to be operated to apply energy onto a second region of the plurality of regions to maintain a temperature of the second region within the predetermined temperature range without causing the build materials in the second region to fuse together; and
- controlling, by the controller, the first warming device and the second warming device to be operated to apply energy onto the first region and the second region, respectively, according to the first energy curve and the second energy curve.

10. The method according to claim 9,
wherein the plurality of events comprise a first event and a second event, at least one of the first event and the second event occurring at a different time for each of the plurality of regions, and wherein calculating the first energy curve for the first warming device and calculating the second energy curve for the second warming device further comprises calculating different energy curves for the first warming device and the second warming device.

11. The method according to claim 10, wherein calculating different energy curves for the first warming device and the second warming device further comprises calculating different energy curves that result in application of a same total amount of energy onto the first region and the second region upon which the first warming device and the second warming device apply energy over different time intervals between the occurrences of the first event and the second event.

12. The method according to claim 9, wherein calculating the first energy curve for the first warming device further comprises:
calculating the first energy curve by adapting the master energy curve based upon predicted temperature changes at the first region during a layer processing operation that includes the occurrences of the plurality of events.

13. The method according to claim 9, wherein accessing the master energy curve further comprises accessing one of a first master energy curve and a second master energy curve, and wherein calculating the first energy curve further comprises calculating the first energy curve from the accessed one of the first master energy curve and the second master energy curve, wherein the first master energy curve corresponds to a first selected print mode and the second master energy curve corresponds to a second selected print mode.

14. A non-transitory computer readable medium on which is stored machine readable instructions that when executed by a processor, cause the processor to:
- calculate, based upon a first region of a plurality of regions on a layer of build materials upon which a first warming device is to apply energy, a first energy curve to be applied to the first warming device between occurrences of a plurality of events, wherein the first energy curve defines timings and levels at which the first warming device is to be operated to apply energy to the first region to maintain a temperature of the first region between a predetermined temperature range without causing the build materials in the first region to fuse together;
- calculate, based upon a second region of the plurality of regions of the layer of build materials upon which a second warming device is to apply energy, a second energy curve to be applied to the second warming device between the plurality of events, wherein the second energy curve defines timings and levels at which the second warming device is to be operated to apply energy to the second region to maintain a temperature of the second region between the predetermined temperature range without causing the build materials in the second region to fuse together; and
- control the first warming device and the second warming device to be operated to apply energy onto the first region and the second region, respectively, according to the first energy curve and the second energy curve.

15. The non-transitory computer readable medium according to claim 14,
wherein a pair of the plurality of events occur over a first time interval over the first region and between a second time interval over the second region, and wherein the first energy curve includes a same amount total energy over the first time interval as the second energy curve over the second time interval.

\* \* \* \* \*